(No Model.)
A. WINTON.
BICYCLE.
No. 461,696. Patented Oct. 20, 1891.
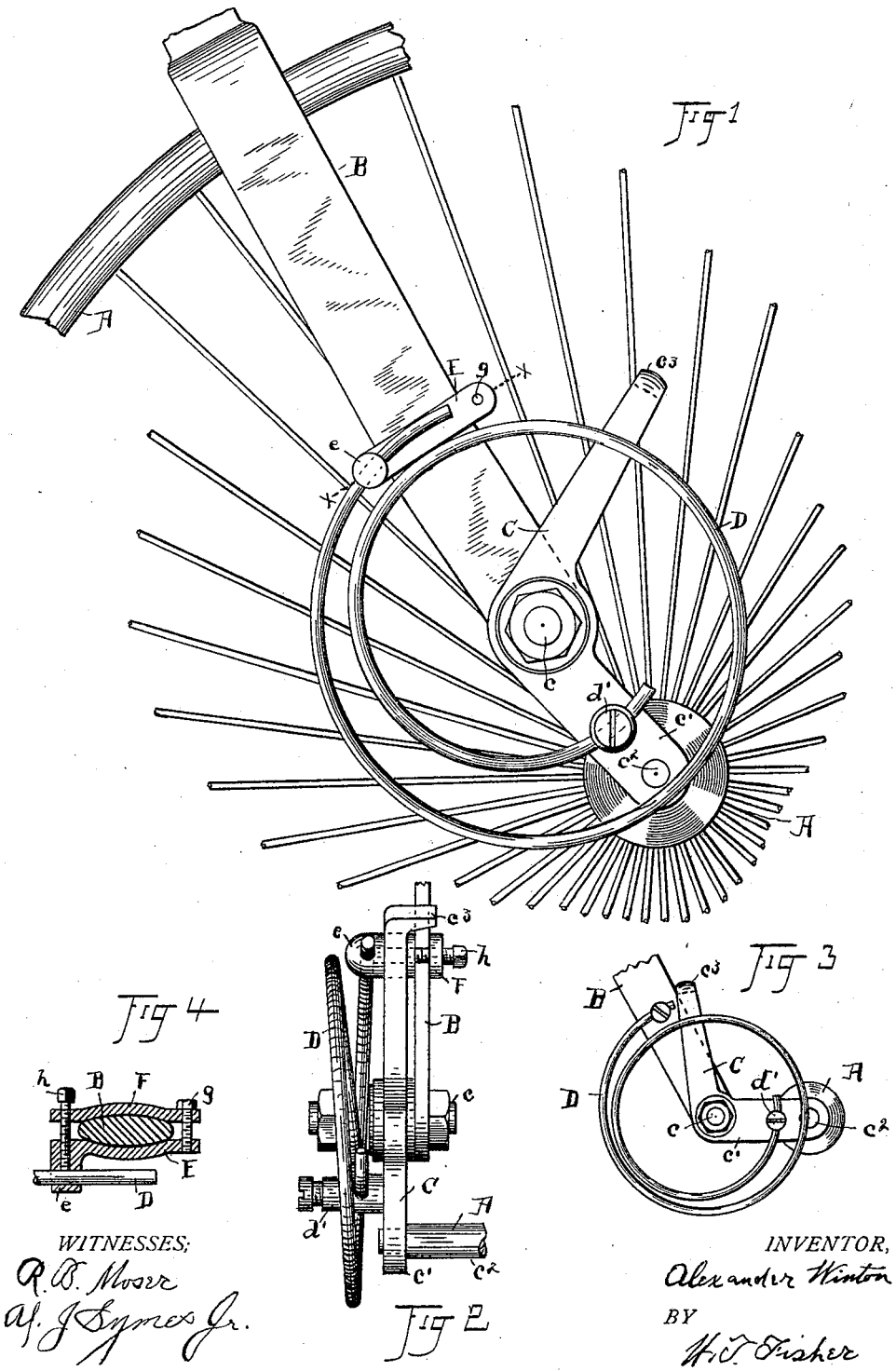
WITNESSES:
R. B. Moser
A. J. Symes Jr.
INVENTOR,
Alexander Winton
BY
H. T. Fisher
ATTORNEY.

UNITED STATES PATENT OFFICE.

ALEXANDER WINTON, OF CLEVELAND, OHIO.

BICYCLE.

SPECIFICATION forming part of Letters Patent No. 461,696, dated October 20, 1891.

Application filed July 8, 1891. Serial No. 398,857. (No model.)

*To all whom it may concern:*

Be it known that I, ALEXANDER WINTON, a citizen of the United States, residing at Cleveland, in the county of Cuyahoga and State of Ohio, have invented certain new and useful Improvements in Bicycles; and I do hereby declare that the following is a full, clear, and exact description of the invention, which will enable others skilled in the art to which it appertains to make and use the same.

My invention relates to improvements in bicycles; and the object of the invention is to provide a bicycle with a spring for cushioning the front wheel, whereby the shock incurred in riding over rough roads or in striking obstructions is relieved.

I am of course aware that different persons have made improvements in this particular part of a bicycle with a similar object in view, and different devices have been made and patented which are designed to compensate for any shock to the vehicle in riding over obstructions; but I am not aware that any one has ever made or used a construction similar to the one embodied in my invention.

My invention consists in a bell-crank lever pivoted at its angle on the extremity of the fork of the frame and having one arm of the lever forming an extension or prolongation, as it were, of the fork, but set primarily at a slight forward inclination thereto, and the other end of the lever constructed to form a stop against the said fork. The wheel-spindle has its bearing in the lower arm of the bell-crank, and a suitable spring is connected at one end with the bell-crank above the wheel-bearing and at the other end with the fork a suitable distance above the crank-pivot, all substantially as shown and described, and particularly pointed out in the claims.

In the accompanying drawings, Figure 1 is a side elevation of a portion of a wheel and a fork resting upon the wheel and of my improved mechanism connected with said parts. Fig. 2 is a front view of the improved mechanism looking in from the right of Fig. 1. Fig. 3 is a side elevation of my improved mechanism on a reduced scale and designed more particularly to illustrate the position of the bell-crank when it has reached the limit of its movement, and the extremity of the upper arm bears against the edge of the fork and prevents a further movement of the parts. Fig. 4 is a cross-section of the fork on line $x$ $x$, Fig. 1, showing the clamping mechanism for the upper end of the spring.

A represents the wheel, which will be understood as being the front wheel of the bicycle, and B is the usual fork, which stands astride of the wheel and has the bell-crank lever C pivoted in its angle at $c$ in the lower extremity of the fork, on the outside thereof. It will be understood that there is a similar construction and arrangement of parts on both sides of the wheel, and it is deemed necessary to show only one side to fully illustrate the invention. The lower arm $c'$ of the bell-crank provides a bearing for the wheel-axle or spindle $c^2$ near its extremity, and the upper arm, as here shown, has its extremity $c^3$ bent laterally, forming a projection which strikes against the fork B when the limit of movement of the said bell-crank is reached, as shown in Fig. 3. Normally the bell-crank will occupy the relation to the fork B, say, substantially as seen in Fig. 1, which is supposed to be its position when there is no load on the vehicle. When the vehicle is occupied, the weight of the rider will carry the lower arm $c'$ forward somewhat from the position seen in Fig. 1, so as to throw the said lower arm at greater variance to the line of the yoke, and thus cause the vehicle to ride continually under a cushion more or less from the spring D. The extreme movement to which the bell-crank may go, and which may be reached only in extreme cases, is illustrated in Fig. 3, where the extension $c^3$ strikes against the yoke B and limits further movement. When this occurs, the yoke over the wheel is still free, so that the yoke will not strike the wheel, and the construction of the bell-crank and its spring and the relation of these parts in any possible position will always be such that the wheel will be free to move just as it would if this improvement were not added. The spring D is secured to the lower arm $c'$ by a screw through a lateral projection $d'$ on said arm, and in which projection the spring is adjustable.

To attach the spring D to the yoke or fork B without drilling a hole therein, I employ a clamp consisting on the outside of a crosspiece E, having a lateral projection e, with a transverse hole for the wire D, and a suitable clamping-piece F for the inside of the fork. These parts extend across beyond both edges of the fork and at one side are held together by a machine-screw g and at the other side by a set-screw h, which extends through both clamping-pieces and against the wire D to hold the same adjustably in position.

It will be seen from the foregoing description and the illustration of the invention that the construction here employed is an exceedingly simple one, and one which can be adapted to any bicycle now in use, as well as to those which are built especially for the use of this improvement, and that there is nothing about the construction to rattle or make a noise, or to get loose, or to in any way interfere with the use of the machine.

The fastening or clamping screw g, above referred to, is relied upon to secure the pieces E and F on the fork, the set-screw h being threaded through both said parts, but limited in its movement by the wire D, against which it bears. The wheel-axle or spindle $c^2$ does not extend through the fork to interfere in any manner with the added mechanism.

The spring D is made of suitable steel wire bent to form a true circle, or substantially that form, and having its ends overlapping about half the circle and attached, respectively, to the fork and to the lever extension or lever C. It will be noticed that the points at which said spring ends are secured are nearly equidistant from the pivot-point c of the lever extension. This circular or ring shape of the spring, taken with the points of attachment above and below the pivot c, brings every part of the spring into action when the down-pressure occurs and avoids strain at any given part of the spring. This is deemed highly important, owing to the tendency in springs under unequal strain to crystallize at the strained point and snap off. Again, this form of spring makes the spring sensitive at the beginning of its action, where sensitiveness is most wanted. Thus in riding over cobblestone pavement there is a constant tremor or vibration on account of the jar from stone to stone, and the spring being open and long in its bend I get sensitiveness that responds at once to this jar and absorbs it, so that the jar or accent is not transmitted to the rider. This would be impossible with a short spring, which would have to be equal to all demands upon it at its initial spring-point, and hence too stiff to operate as my construction does. It will be seen that by this arrangement, also, the pivot of lever C is brought opposite the center of spring D, around which center the spring contracts and expands.

Having thus described my invention, what I claim as new, and desire to secure by Letters Patent, is—

1. In a bicycle, the fork, a bell-crank lever pivoted in its angle to the fork, the wheel supported in one arm of said lever and the other arm constructed to form a stop to the movements of the lever, and a spring secured to the said lever and the fork, substantially as described.

2. In a bicycle, the fork provided with a pivoted extension, a spring connected with said extension, and a clamp for securing one end of said spring to said fork, having opposite clamping-pieces bearing against the sides of the fork, and a screw for fastening the spring to said pieces, substantially as described.

3. In a bicycle, the fork and a lever extension pivoted to the extremity of said fork, in combination with a wire spring bent to the form substantially of a true circle and having its overlapping ends secured to the said fork and the lever extension, respectively, above and below the pivot-point of the said lever extension, whereby said pivot-point is brought substantially opposite the center of the spring, substantially as set forth.

Witness my hand to the foregoing specification this 23d day of June, 1891.

ALEXANDER WINTON.

Witnesses:
H. T. FISHER,
H. L. McLANE.